(12) United States Patent
Kempf

(10) Patent No.: US 10,612,695 B2
(45) Date of Patent: Apr. 7, 2020

(54) CLOSABLE SPACER FOR TUBE

(71) Applicant: TI AUTOMOTIVE ENGINEERING CENTRE (HEIDELBERG) GMBH, Heidelberg (DE)

(72) Inventor: Dominik Kempf, Frankfurt (DE)

(73) Assignee: TI AUTOMOTIVE ENGINEERING CENTRE (HEIDELBERG) GMBH, Heidelberg (DE)

( * ) Notice: Subject to any disclaimer, the term of this patent is extended or adjusted under 35 U.S.C. 154(b) by 16 days.

(21) Appl. No.: 15/745,271

(22) PCT Filed: Jul. 4, 2016

(86) PCT No.: PCT/EP2016/065729
§ 371 (c)(1),
(2) Date: Jan. 16, 2018

(87) PCT Pub. No.: WO2017/009087
PCT Pub. Date: Jan. 19, 2017

(65) Prior Publication Data
US 2019/0003615 A1   Jan. 3, 2019

(30) Foreign Application Priority Data
Jul. 16, 2015   (DE) .................. 20 2015 103 746 U

(51) Int. Cl.
| | | |
|---|---|---|
| *F16L 3/00* | (2006.01) | |
| *F16L 3/12* | (2006.01) | |
| *F16L 57/06* | (2006.01) | |
| *F16L 7/00* | (2006.01) | |
| *F16L 55/033* | (2006.01) | |
| *B62J 11/00* | (2020.01) | |
| *F16L 55/035* | (2006.01) | |

(Continued)

(52) U.S. Cl.
CPC .................. *F16L 3/12* (2013.01); *B62J 11/00* (2013.01); *F16L 7/00* (2013.01); *F16L 55/035* (2013.01);
(Continued)

(58) Field of Classification Search
CPC ... F16L 3/14; F16L 7/00; F16L 3/1215; Y10T 403/17; Y10T 403/69
(Continued)

(56) References Cited

U.S. PATENT DOCUMENTS

| 840,337 A | * | 1/1907 | Johnson | F16L 3/14 248/60 |
|---|---|---|---|---|
| 3,603,538 A | * | 9/1971 | Vitas | F16L 3/14 248/327 |

(Continued)

FOREIGN PATENT DOCUMENTS

| AU | 7167774 A | 1/1976 |
|---|---|---|
| DE | 8705590 | 7/1987 |

(Continued)

OTHER PUBLICATIONS

International Search Report from corresponding PCT application No. PCT/EP2016/065729 dated Jan. 19, 2017 (3 pgs).
European Search Report dated Jan. 25, 2019.

*Primary Examiner* — Patrick F Brinson
(74) *Attorney, Agent, or Firm* — Dickinson Wright PLLC

(57) ABSTRACT

Spacer for a hose or pipeline, comprising a spacing pipe that is fitted around the hose or pipeline during normal use, wherein the spacing pipe is slit in the lengthwise direction, and wherein the spacing pipe is constructed in segments, and wherein the segments are connected to each other in articulated manner, wherein the segments assigned to the slit are finished with locking elements.

18 Claims, 3 Drawing Sheets

(51) Int. Cl.
*F16B 2/08* (2006.01)
*F16B 2/10* (2006.01)
*B62J 99/00* (2020.01)

(52) U.S. Cl.
CPC ........... *F16L 55/0335* (2013.01); *F16L 57/06* (2013.01); *B62J 2099/0046* (2013.01); *F16B 2/08* (2013.01); *F16B 2/10* (2013.01)

(58) Field of Classification Search
USPC ......... 138/112, 113, 110; 248/61, 74.1–74.3; 251/335.3
See application file for complete search history.

(56) References Cited

U.S. PATENT DOCUMENTS

| | | | | |
|---|---|---|---|---|
| 4,182,378 A | * | 1/1980 | Dieter | ....................... F16L 7/00 138/112 |
| 4,408,924 A | | 10/1983 | Huebner | |
| 5,592,975 A | * | 1/1997 | Wissmann | ................ F16L 7/00 138/112 |
| 5,743,302 A | * | 4/1998 | McNeely | .................. F16L 7/00 138/108 |
| 5,836,367 A | * | 11/1998 | Calabrese | ............. F16L 3/1215 138/112 |
| 7,451,579 B2 | * | 11/2008 | Azarin | .................... E04C 5/203 248/74.3 |

FOREIGN PATENT DOCUMENTS

| | | |
|---|---|---|
| DE | 20217245 U1 | 1/2003 |
| EP | 0750378 A1 | 12/1996 |
| EP | 1099899 A2 | 5/2001 |
| FR | 1578857 | 8/1969 |
| NL | 9300120 | 8/1994 |

\* cited by examiner

CLOSABLE SPACER FOR TUBE

RELATED APPLICATIONS

This application claims priority to German Patent Application No. 20 2015 103 746.5, filed on Jul. 16, 2015; and PCT/EP2016/065729, filed Jul. 4, 2016.

FIELD

The invention relates to a spacer for a hose or pipeline.

BACKGROUND

Spacers may be attached to hoses or pipelines, and serve to protect the hoses or pipelines from damage or insulate them from vibration. When the hoses or pipelines are installed in mobile apparatuses such as motor vehicles for example, they are exposed to increased vibration. In such a context, the spacers may prevent the hoses or pipelines from rubbing against other components of the mobile apparatus, such as engine components, and thus becoming worn prematurely.

Such a spacer is known from document EP 1 099 899 A1. The known spacer comprises a hose made of rubber or plastic, the inner wall of which is furnished with ribs or pimples and which has a slit in the lengthwise direction thereof. The slit enables the spacer to be drawn over an installed hose or pipeline. In order to lock the spacer, it has a recess on one side of the slit, and a barb conformed to match the recess on the other side of the slit. This enables the spacer to be locked in place on the hose or pipeline after said hose or pipeline has been installed.

BRIEF SUMMARY

According to a first embodiment of the present disclosure, the spacer for a hose or pipeline comprises a spacing element that has mountings for a fastening means, wherein when used as intended the fastening means is passed around the hose or pipeline and attached to the spacing element.

Such a spacer is of particularly simple design, and consequently it is particularly inexpensive. The spacer consists of two elements at most, and the spacing element can be made from a thermoplastic material particularly inexpensively. The fastening means preferably consists of an elastomer material, that is to say it is expandable. In this context, it is conceivable for the fastening means to have the form of a rubber ring.

In one preferred variant, the fastening means has the form of an 0-ring. 0-rings can be obtained inexpensively in various sizes and with various diameters. Good resistance to aggressive media such as wastewater may also be achieved by appropriate material selection.

The spacing element is preferably furnished with retaining tabs. In an advantageous variant, the spacing element is annular and oval and has inwardly projecting retaining tabs at the points where the radius is small. During normal use, the retaining tab accommodate the fastening means, so that the spacer is held against the hose or pipeline automatically.

According to a further variant according to the present disclosure, the spacer comprises a flexible, strip-like spacing body for a hose or pipeline, which is passed round the hose or pipeline during normal use, wherein the mutually contacting edges of the spacing body are given a locking geometry, wherein a locking body engages in the locking geometry and secures the spacing body in place on the hose or pipeline.

In this context, the spacing body may be made up of sections of an endless strip. The endless strip may consist of an elastomer material and be manufactured inexpensively in extrusion processes. In such cases, it is then particularly also advantageous, if the width of the spacing body, that is to say its dimension in the lengthwise direction of the hose or pipeline, is freely selectable depending on local requirements. It is even conceivable not to fix the length of the spacing element until immediately before it is installed, wherein the endless strip may be cut to size by simple mechanical means.

The locking body preferably consists of a thermoplastic material, and can also be manufactured by extrusion processes. In this case, it is conceivable for the locking body to be in the form of a rod, which is also cut to the required length immediately before it is installed.

For installation, the spacing body is fitted around the hose or pipeline, and then the locking body is engaged in the locking geometry, so that the spacing body is fixed in place on the hose or pipeline.

The locking geometry of the strip-like spacing body may be created by L-shaped projections. If the spacing body is fitted around the hose or pipeline, a T-shaped arrangement of the locking geometry with an undercut on both sides is obtained. Alternative variants with hemispherical or triangular projections are also conceivable. In all cases, it is essential to the invention that an undercut geometry is created when the two projections are joined.

The locking body is preferably shaped congruently with the locking geometry, so that an advantageous locking body has a T-shaped groove. In this context, the locking body may be constructed with enough elasticity to enable the locking body to be clipped onto the locking geometry by simple pressing, and the L-shaped projections snap into place in the T-shaped groove. In this way, a secure, easily producible connection is created. In alternative variants, a spherical or triangular or rectangular groove is created.

The side of the spacing body facing the hose or pipeline may be contoured. In such cases, the contouring preferably extends in the lengthwise direction of the hose or pipeline. This variant has the effect of increasing the flexibility of the spacing body, thereby making it easier to install, particularly at low temperatures. It also serves to compensate for unevennesses in the hose or pipeline. It also increases the local surface pressure, thereby ensuring that the spacing body is securely seated on the hose or pipeline. The contouring suppresses vibration and serves as protection against wear. The contouring includes protruding sections of any geometry.

In this context, it is conceivable that the contouring or the prominences that form the contouring are made from a different material than the spacing body. Very good vibration suppression may be achieved by suitable selection of the material, for example a thermoplastic elastomer. In this case, it is conceivable to manufacture the spacing body and the contouring in a two-component extrusion process.

In an advantageous variant, the contouring is present in the form of rectangular or trapezoidal prominences. Such prominences may be provided quite simply during the manufacturing process, for example during the extrusion process. Rectangular prominences are also particularly robust.

The spacer for a hose or pipeline of a further solution according to the invention comprises a spacing pipe which is fitted around the hose or pipeline during normal use, wherein the spacing pipe is slit in the lengthwise direction, the spacing pipe is made up of segments, and the segments are connected to each other in articulate manner, and wherein the segments assigned to the slit are furnished with locking elements.

A spacer of such kind can also be manufactured simply and inexpensively. Such a spacer is also particularly robust due to the segmented construction of the spacing pipe. The segments preferably consist of a thermoplastic material and may be produced by extrusion.

The segments are preferably connected to each other via film hinges. This enables the segments to be unfolded to allow the spacing pipe to be installed, so that the spacing pipe can be fitted around the hose or pipeline. In this context, according to first variant the segments and the film hinges may be constructed from the same material and as a single part. In this variant, the segments and the film hinges may be manufactured in a single step, for example in an extrusion process. The result is a particularly inexpensive spacer.

The segments may be furnished with interspaces or cavities. Not only does this reduce the weight of the segments, it also lends them greater rigidity, resulting in a particularly strong spacer. The segments in which cavities are provided are able to compensate for mechanical loads in the form of sudden impacts. A weight saving is also realised. At the same time, the distance between the two elements to be kept apart may be increased.

The locking elements comprise a projection having a preferably arrow-shaped tip and an opening that is conformed to allow the projection to engage in the opening. Then, the arrow-shaped tip engages in the opening and fixes the spacer in place on the hose or pipeline. In this variant, the connecting elements form a snap lock.

Projections may be provided on the inside and/or the outside of the segments. The projections arranged on the outside prevent a directly adjacent element, for example a component of the engine, from bearing flush against the segments. This is advantageous particularly when such an element can reach elevated temperatures. The projections arranged on the outside, in the form of ribs for example, may serve to prevent a great deal of heat from being transferred. The projections arranged on the inside, in the form of prominences extending in the lengthwise direction of the hose or pipeline for example, improve the stability of the seating of the spacing pipe on the hose or pipeline, thus ensuring that it is secured firmly in place on the line.

The projections may also be made from a different material than the spacing pipe. Very good vibration suppression may be achieved by selection of a suitable material, for example a thermoplastic elastomer. In this context, it is conceivable to produce the spacing pipe and the projections in a two-component extrusion process.

The projections and/or film hinges may be made from an elastomer material. In this case, a thermoplastic elastomer that can be processed in an extrusion process is particularly suitable. Film hinges made from an elastomer material enable a particularly flexible spacing pipe to be produced, which can be installed on a hose or pipeline with little effort.

Some variants of the spacer according to the present disclosure will be explained in greater detail in the following with reference to the drawing. In the drawing:

DETAILED DESCRIPTION OF THE DRAWINGS AND THE PRESENTLY PREFERRED EMBODIMENTS

Figure 1A:
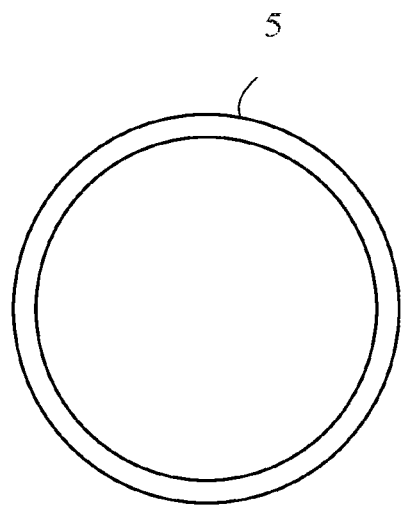
FIG. 1a is a diagrammatic representation of a spacer with a spacing element.
Figure 1B:
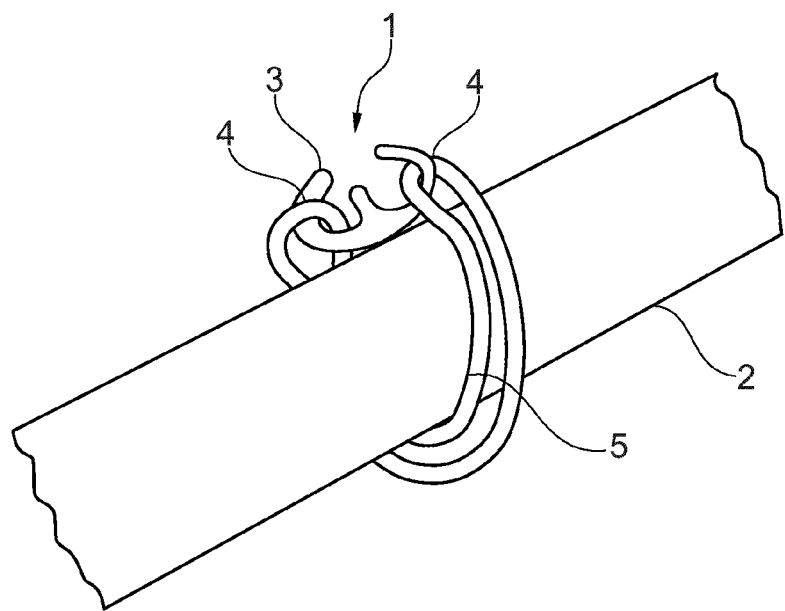
FIG. 1b is a perspective view of the spacer of FIG. 1a applied to a tube and secured with fastening means.

FIG. 1 shows a spacer 1 for a hose or pipeline 2, comprising a spacing element 3 that has mountings 4 for a fastening means 5.

Spacing element 3 consists of a thermoplastic material. Spacing element 3 is in the shape of an oval ring and has a radially inwardly projecting retaining tab for accommodating a fastening means 5 as the mounting 4 in the area of its smallest radius.

During normal use, fastening means 5 is fitted around hose or pipeline 2 and secured on the retaining tabs of spacing element 3. Fastening means 5 has the form of an 0-ring.

Figure 2A:
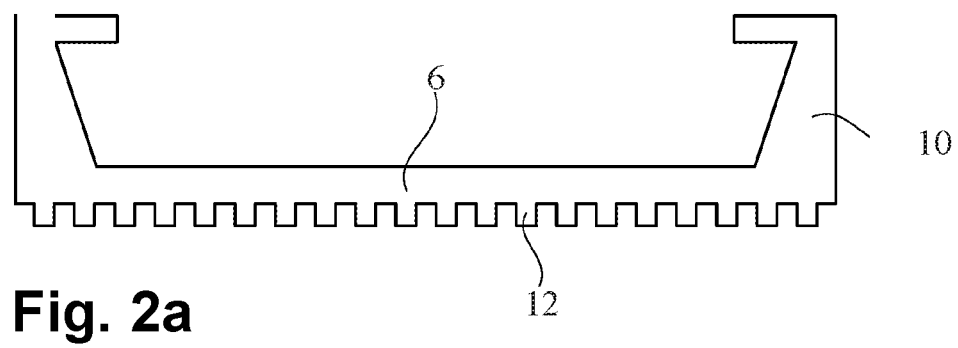
FIG. 2a is a diagrammatic representation of a spacer with a strip-like, flexible spacing body.
Figure 2B:
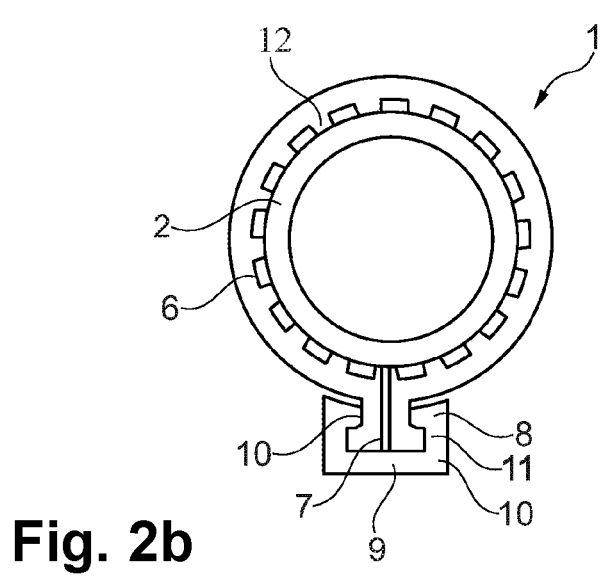
FIG. 2b is a front view of the spacing body of FIG. 2a applied to a tube and secured with fastening means.
Figure 2C:
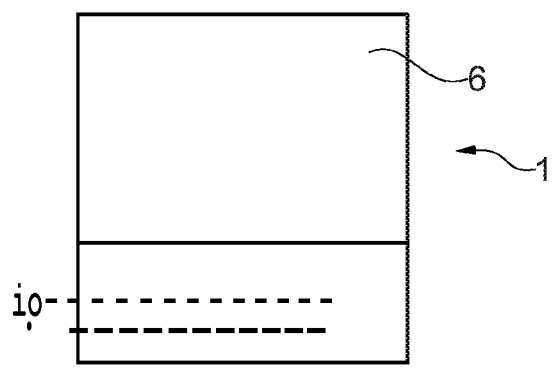
FIG. 2c is a side view of the spacing body a shown is FIG. 2b.

FIG. 2 shows a further variant according to the invention of a spacer 1 for a hose or pipeline 2. Spacer 1 comprises a strip-like, flexible spacing body 6 made from an elastomer material. Spacing body 6 is produced in an extrusion process and is shortened to a predetermined length immediately before installation.

During normal use, spacing body 6 is fitted around hose or pipeline 2. Spacing body 6 has a locking geometry 8 at the mutually touching edges 7 thereof. Locking geometry 8 is created in the form of L-shaped projections 10, which are arranged at the mutually touching edges 7 of spacing body 8. Once spacing body 6 has been fitted around hose or pipeline 2, projections 10 come into contact with each other to form a radially outwardly protruding T-shaped projection.

A locking body 9 engages in locking geometry 8 and fixes spacing body 6 firmly in place on hose or pipeline 2.

Locking body 9 has a T-shaped groove 11 that is conformed congruently with the joined L-shaped projections 10. Locking body 9 consists of thermoplastic material and is also cut to a preselected length immediately before it is installed.

The side of spacer 1 facing towards hose or pipeline 2 has contouring 12 in the form of rectangular prominences. Other variants of the contouring, in trapezoidal, round or oval shapes, for example, are also conceivable.

Figure 3:
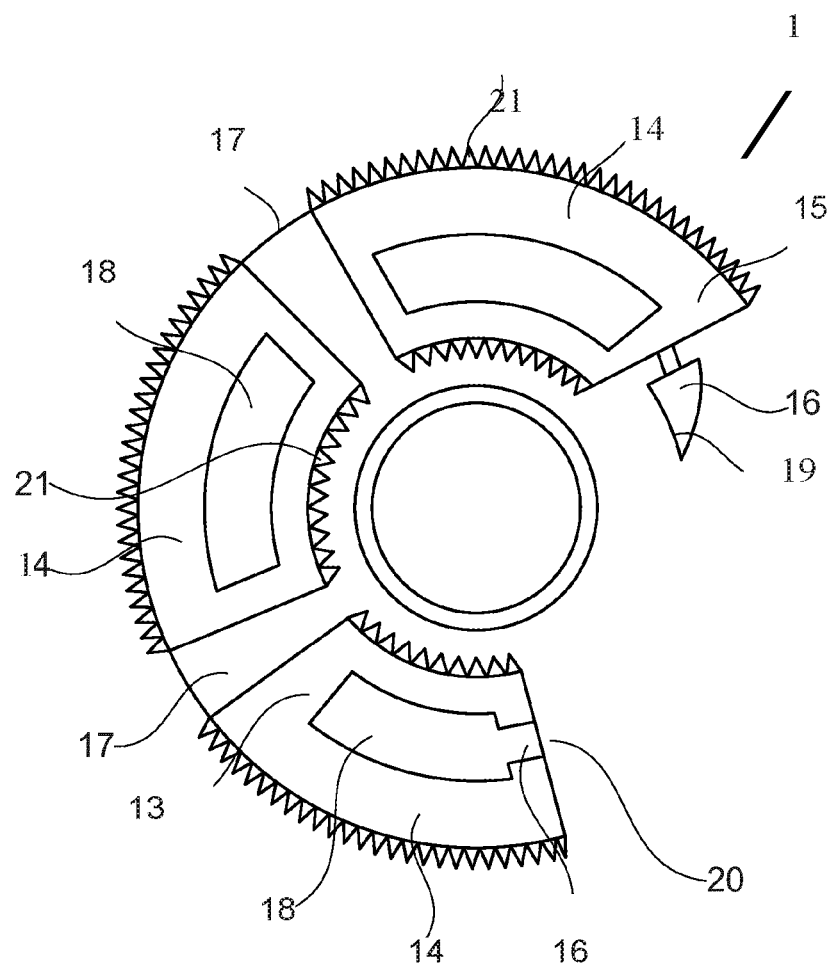
FIG. 3 is a diagrammatic representation of a spacer with a spacing pipe.

FIG. 3 shows a third variant according to the invention of a spacer 1 for a hose or pipeline 2. Spacer 1 comprises a spacing pipe 13, which is fitted around hose or pipeline 2 during normal use. Spacing pipe 13 is slit in the lengthwise direction and constructed in segments 14. Segments 14 are connected to each other in articulated manner. The segments 14 that are assigned to slit 15 are furnished with locking elements 16. The articulated connection of segments 14 is created by film hinges 17, which connect segments 14 to each other. Segments 14 have interspaces 18 or cavities. Said segments 14 are made from thermoplastic material.

Spacing pipe 13 is furnished with projections 21 on the inside and the outside. Projections 21 and film hinges 17 are made from thermoplastic elastomer.

Both segments 14 and projections 21 with film hinges 17 are manufactured in an extrusion process. This makes it possible to manufacture spacer 1 in one step and as a single part.

Locking elements 16 have a projection 19 with a thickened portion that creates an undercut, and an opening 20 into which projection 19 may be inserted for locking. In this variant, one locking element 16 consists of a projection 19 with arrow-shaped tip extending in the lengthwise direction and another locking element 16 consists of an opening 20 created in a segment 14. In order to create a lock, projection 19 is introduced into opening 20, in which it engages, thereby firmly fixing spacing pipe 13 on hose or pipeline 2. In this context, projection 19 protrudes into cavity 18.

The invention claimed is:

1. Spacer for a hose or pipeline, comprising a strip-like flexible spacing body that is fitted around the hose or pipeline during normal use, wherein the mutually touching edges of the spacing body are furnished with a locking geometry, wherein a locking body engages in the locking geometry and fixes the spacing body in place on the hose or pipeline, wherein a side of the spacing body facing toward the hose or pipeline is contoured, wherein the contouring has trapezoidal prominences.

2. Spacer according to claim 1, wherein the locking geometry is created by L-shaped projections.

3. Spacer according to claim 1, wherein the locking body has a T-shaped groove.

4. Spacer for a hose or pipeline, comprising a spacing pipe that is fitted around the hose or pipeline during normal use, wherein the spacing pipe is slit in the lengthwise direction, and wherein the spacing pipe is constructed in segments, and wherein the segments are connected to each other in articulated manner, wherein the segments assigned to the slit are furnished with locking elements, wherein a side of each segment facing toward the hose or pipeline is contoured, wherein the contouring is made of a material different from a material of the spacing body.

5. Spacer according to claim 4, wherein the contouring has trapezoidal prominences.

6. Spacer according to claim 5, wherein the contouring has rectangular prominences.

7. Spacer according to claim 4, wherein the segments are connected to each other via film hinges.

8. Spacer according to claim 4, wherein the segments have an interspace.

9. Spacer according to claim 4, wherein the locking elements have a projection with a thickened section that forms an undercut, and an opening into which the projection can be introduced for locking.

10. Spacer according to claim 4, wherein the segments are made from thermoplastic material.

11. Spacer according to claim 4, wherein the inside and outside of the spacing pipe is furnished with projections.

12. Spacer according to claim 7, wherein the film hinges and/or projections are made from elastomer material.

13. Spacer for a hose or pipeline, comprising a strip-like flexible spacing body that is fitted around the hose or pipeline during normal use, wherein the mutually touching edges of the spacing body are furnished with a locking geometry, wherein a locking body engages in the locking geometry and fixes the spacing body in place on the hose or pipeline, wherein a side of the spacing body facing toward the hose or pipeline is contoured, wherein the hose or pipeline defines a longitudinal axis, and wherein the contouring includes alternating peaks and valleys extending longitudinally.

14. Spacer according to claim 1, wherein the contouring is made of a material different from a material of the spacing body.

15. Spacer according to claim 4, wherein the hose or pipeline defines a longitudinal axis, and wherein the contouring includes alternating peaks and valleys extending longitudinally.

16. Spacer according to claim 4, wherein the contouring is formed by prominences making point-contact with the hose or pipeline.

17. Spacer according to claim 13, wherein the contouring is made of a material different from a material of the spacing body.

18. Spacer according to claim 13, wherein the contouring has trapezoidal prominences.

* * * * *